March 10, 1936.   W. B. PLUMMER   2,033,737
CATALYST
Filed July 11, 1930
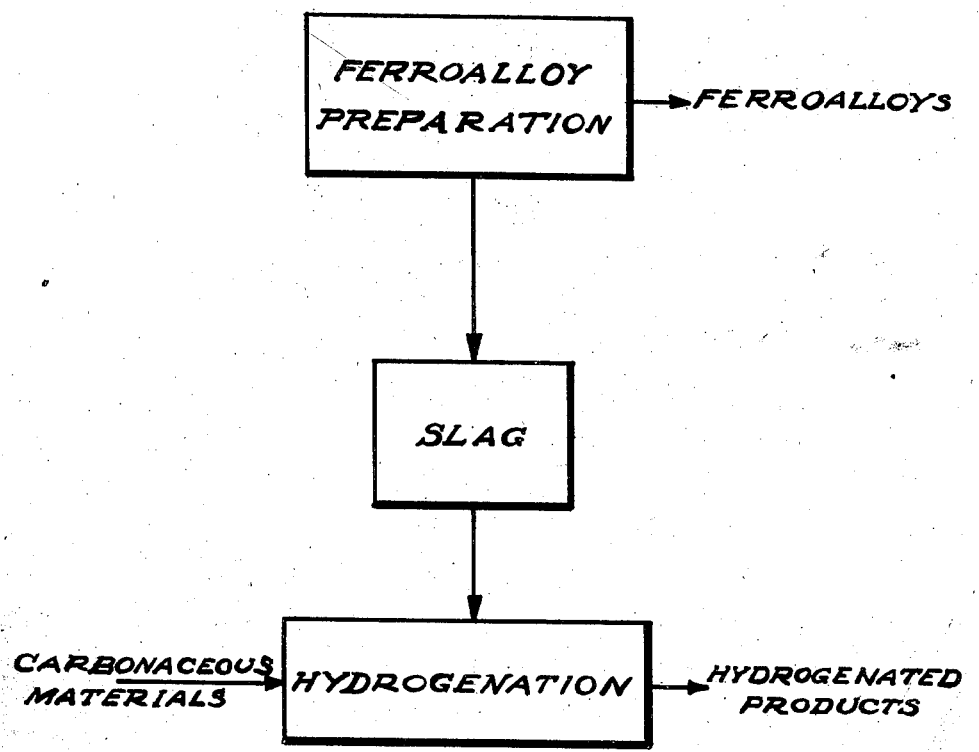
William B. Plummer Inventor
By P. L. Young Attorney Patented Mar. 10, 1936

2,033,737

UNITED STATES PATENT OFFICE 2,033,737

CATALYST

William B. Plummer, Chicago, Ill., assignor to Standard Oil Company (Indiana), Chicago, Ill., a corporation of Indiana Application July 11, 1930, Serial No. 467,381

1 Claim. (Cl. 196—53)

This invention relates to catalysts for effecting the conversion of petroleum oils. The object of my invention is to provide a catalyst whereby increased yields of gasoline and valuable lubricating oils may be obtained from crude petroleum and refinery products. A further object is to provide a catalyst which will increase the speed of the hydrogenation or cracking reaction, which will be highly resistant to such catalyst poisons as sulfur, and which can be readily prepared and manipulated. A further object is to utilize waste or by-products by converting them into valuable catalysts or catalyst promoters. Other objects will be apparent as the detailed description of my invention proceeds.

Heavy residues and petroleum products such as coke having undesirable characteristics may be converted into valuable products by a process of hydrogenation which takes place at elevated temperatures and pressures in the presence of hydrogen gas and a suitable catalyst. Many catalysts have been proposed for this reaction and complicated and expensive processes have been devised for obtaining metals or metal compounds of suitable physical and chemical characteristics. I have discovered that certain slags which result from the preparation of ferro-alloys contain catalyst metals in a suitably active condition. The invention contemplates the use of these ferro-alloy slags or similar material as catalysts for hydrogenation processes. The term ferro-alloys is herein used in the usual technical sense as referring to homogeneous combinations or mixtures of iron with a relatively large proportion of a more valuable metal, containing only small amounts of other metals or impurities, and ordinarily destined for use in the manufacture of alloy steels containing smaller proportions of the given valuable metal constituent.

The drawing represents diagrammatically the preparation of the slag and its use as a catalyst in the hydrogenation of carbonaceous materials.

A highly desirable slag is obtained in the manufacture of ferro-chromium. This slag contains from 5–10% chromium oxide, from 5–20% iron oxide, from 10–70% alumina and silica, and from 5–50% alkaline earth oxides. In this example, and in the following examples, the percentages are conventionally expressed as metal oxides, but this expression should not be construed to mean that the metals are actually present as free or uncombined oxides because I do not limit myself to any particular chemical composition or combination of the various elements present. I cannot state definitely why these particular slags are effective as hydrogenation catalysts, but I find that the multivalent metals having atomic weights between 48 and 96, especially such metals belonging also to the sixth group of the periodic system, as incorporated in these slags, are in a form which is highly desirable (for the present catalytic purposes) from the standpoint of chemical composition, physical state and surface tension characteristics. By the term multivalent metals I refer to metals capable of showing two or more states of valency, which are more or less readily transformable one into another.

As another example of my improved catalyst I may use a ferro-alloy slag resulting from the manufacture of ferro-molybdenum. These slags contain about 1–2% molybdenum oxides, 5–20% iron oxides, 10–70% alumina and silica, and 5–50% alkaline earth oxides. Here, however, the exact chemical formula is apparently unimportant and the effectiveness of the catalyst appears to be due to compounds of multivalent metals having atomic weights of from 48 to 96, especially the molybdenum compounds contained therein.

As another example I may use slags from the preparation of ferro-vanadium. These slags contain about 1–2% vanadium oxides together with iron oxides, siliceous materials, alkaline earth oxides, etc. in amounts substantially as above stated. Other examples of ferro-metal slags are those prepared from the manufacture of ferro-tungsten, ferro-titanium, ferro-manganese, etc. In all of these cases the alloy is somewhat siliceous in character, and it contains small amounts of compounds of catalytic metals (as hereinbefore generally described and classified), and/or catalyst promoters in active physical and chemical forms.

I do not limit myself to slags produced in ferro-alloy manufacture and I contemplate the use of similar slags obtained in other industrial processes. For instance, in the manufacture of certain nickel chromium alloy steels a slag is obtained which contains about 6–8% chromium oxide, 2–4% nickel oxide, 5–10% iron oxide, 15–40% alumina and silica, and about 40% lime. Other slags contain compounds of titanium, vanadium, chromium, manganese, columbium, molybdenum, etc.

The slag may be used without further treatment but I find that if it is introduced directly from the furnace into water its surface area is considerably increased and it is rendered more active.

My improved catalyst may be used in any apparatus designed for the conversion by the hydrogenation process of petroleum byproducts, coke, powdered coal, bitumens, or other carbonaceous materials into desirable products, such as gasoline. If the hydrogenation takes place in the liquid phase the catalyst may be suspended in the liquid, and if the process is in the gaseous phase the catalyst may be mounted on suitable screens or trays. The particular temperatures, apparatus, etc. used in the hydrogenation reaction form no part of my present invention. These features will therefore not be specifically described.

I claim:

In a process for treatment of crude petroleum and carbonaceous materials with free hydrogen at elevated temperatures and pressures involving hydrogenation and cracking, to produce increased yields of gasoline and valuable lubricating oils, the step of carrying out the reaction in the presence of a catalyst comprising a slag produced in the refining of ferro-alloys and containing 1% to 10% of an oxide of a metal selected from the class of chromium, molybdenum, tungsten, vanadium, titanium and manganese, 5% to 20% of iron oxide, 10 to 70% of silica and 5% to 50% of alkaline earth oxides.

WILLIAM B. PLUMMER.